Figure 1:
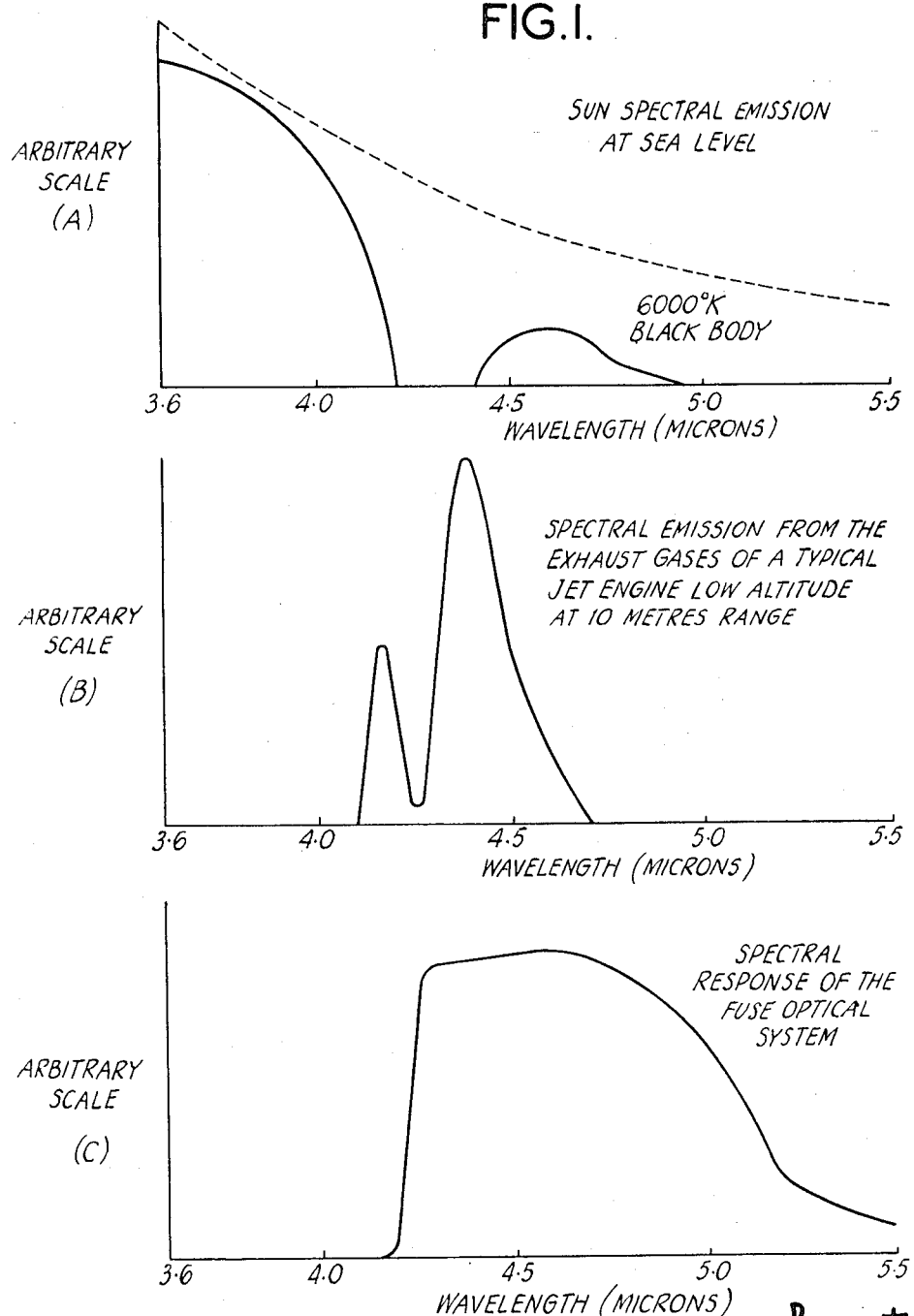

United States Patent [19]
Godfrey

[11] 3,727,553
[45] Apr. 17, 1973

[54] FUZE DEVICE WITH TARGET DETECTING MEANS

[75] Inventor: Peter Brian Godfrey, Luton, England

[73] Assignee: Hawker Siddeley Dynamics Limited, Hatfield, Hertfordshire, England

[22] Filed: Dec. 6, 1966

[21] Appl. No.: 600,005

[30] Foreign Application Priority Data

Dec. 6, 1965 Great Britain.....................51,717/65

[52] U.S. Cl..........................102/70.2 P, 250/83.3 H
[51] Int. Cl................................................F42b 5/08
[58] Field of Search .........................102/70.2 P, 70.2; 244/3.16; 250/83.3 IR

[56] References Cited

UNITED STATES PATENTS

| 3,149,231 | 9/1964 | Ravich | 244/3.16 |
| 3,282,540 | 11/1966 | Lipinski | 244/3.16 |

FOREIGN PATENTS OR APPLICATIONS

| 635,431 | 1/1962 | Canada | 102/70.2 P |

OTHER PUBLICATIONS

"IR System Designer Faces Many Hurdles" by Philip J. Klass, Aviation Week, Mar. 11, 1957, pp. 78–79, 81, 83, 84, 85, 89, 91 and 92.

Primary Examiner—Samuel Feinberg
Attorney—Karl W. Flocks

[57] ABSTRACT

A fuse device capable of producing a signal in proximity to a target in response to changes in infra-red radiation due to the presence of the target, the device having a single field of view, a device responsive to radiation in said field of view to produce corresponding electrical signals, optical means interposed between said device and said field of view and operable to discriminate against radiation outside a selected range of wavelengths and electronic means supplied with said electrical signals and having a frequency band-pass selected to reject signals having a frequency below a selected value corresponding to a selected minimum rise-time of the signals.

2 Claims, 13 Drawing Figures

FIG. 2. FUSE SYSTEM SCHEMATIC DIAGRAM.

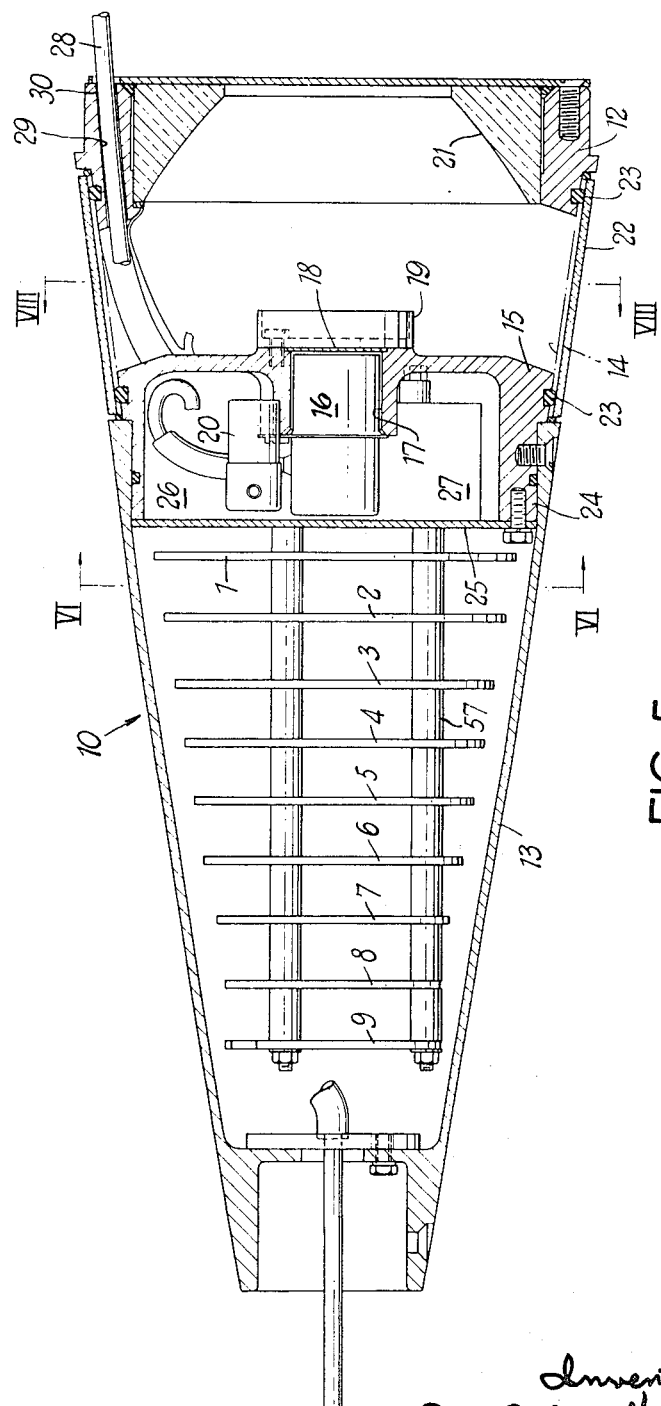

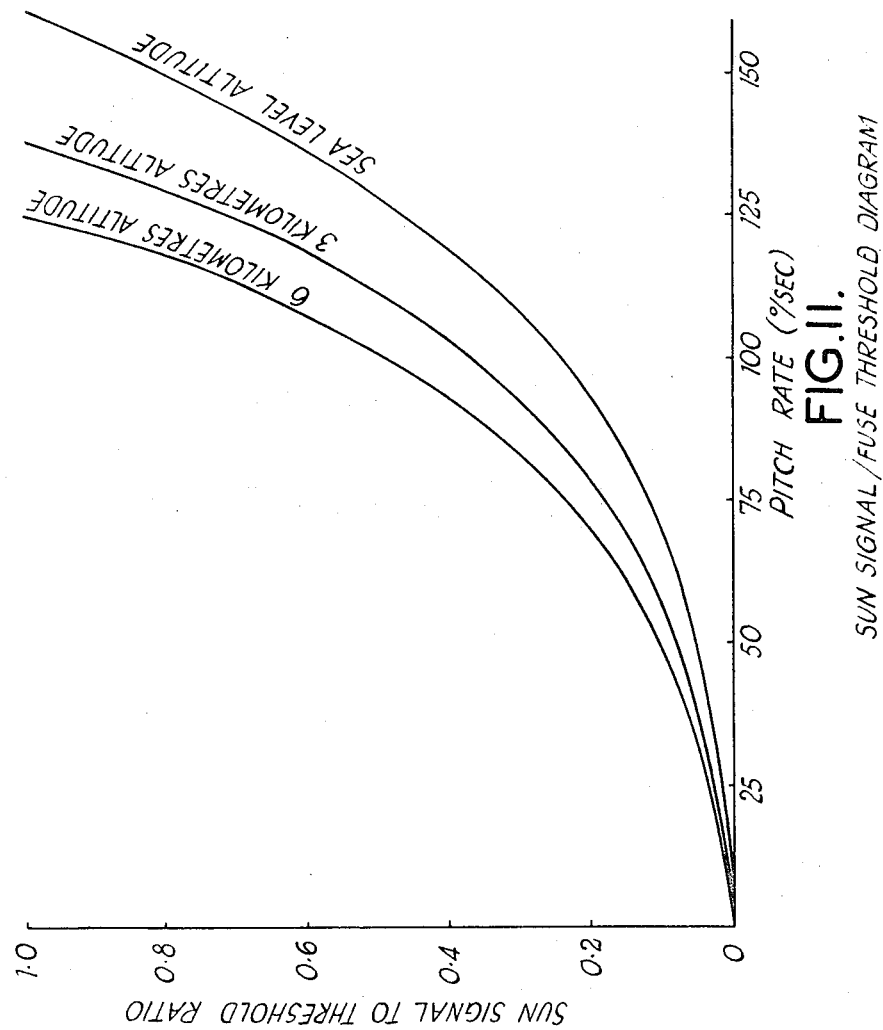

FUZE DEVICE WITH TARGET DETECTING MEANS

This invention relates to improvements in fuze devices such as are used in missiles to initiate explosion of a warhead in proximity to a target. A form of such fuze devices respond to infra-red radiation from a source of radiation on the target. The radiation source may be a. near blackbody radiation from a jet pipe
b. near blackbody radiation from a piston engine exhaust pipe,
c. $CO_2$ hot gas radiation at about 4.4 microns wavelength
d. near blackbody radiation from kinetically heated aircraft and missile surfaces, or
e. near blackbody radiation from engine heat conducted to aircraft surfaces One of the problems associated with the design of such fuze devices is that of enabling the device to distinguish between radiation from the sun and radiation from the target. This is frequently achieved by providing the device with two diverging fields of view and deriving a measure of the time taken by the radiation source to pass from one field of view to the other. Solar radiation may then be rejected by a time gate which a duration less than that of sun signals resulting from the pitching motion of the missile and are thus discriminated against.

There exists, however, a demand for less sophisticated and less expensive fuze devices capable of operating in lethal proximity to a target.

There is considerable atmospheric absorption of the sun's radiation particularly at wavelengths towards the lower end of the range normally of interest in detecting radiation from aeroplanes, missiles and similar targets. Furthermore, the level of that part of the sun's radiation having a wavelength within the band which is of interest is considerably reduced. Additionally, the entry of the sun into a fuze field of view due to missile pitching motion produces a signal from a radiation detector which has a rise-time which is long compared with that produced from a target. Consequently, we have found it possible to devise a fuze device operating with only a single beam or field of view which is capable of discriminating between the sun and a target.

According to the present invention, there is provided a fuze device capable of producing a signal in proximity to a target in response to changes in infra-red radiation due to the presence of the target, the device having a single field of view, a device responsive to radiation in said field of view to produce corresponding electrical signals, optical means interposed between said device and said field of view and operable to discriminate against radiation outside a selected range of wavelengths and electronic means supplied with said electrical signals and having a frequency band-pass selected to reject signals having a frequency below a selected value corresponding to a selected minimum rise-time of the signals.

In one application, as applied to a short range ground to air missile, it is preferred that the optical means should discriminate against radiation outside the range of 4.2 to 6.5 microns.

with advantage, the upper limit of the range is defined by a window through which radiation is admitted to the device and the lower limit is defined by an interference filter disposed in the path of radiation between the window and the radiation responsive device.

Desirably, the window is formed from calcium aluminate glass and the radiation sensitive device is an indium-antimonide cell. Advantageously, means is provided to cool the cell to a temperature below 0°C. and preferably of the order of −40°C. The cooling means is conveniently a single-shot system operating on the evaporation principle and embodying a refrigerant. Means is provided to break a seal when the missile is committed to be launched to allow the refrigerant to boil off at ambient pressure.

The window is preferably mounted on a triangulated frame which connects the fuze device to the body of the missile on which it is carried, the triangulated frame being designed so that the axial length of window aperture is constant through 360° about the missile axis.

The electronic means is preferably arranged to reject signals having a rise-time corresponding to frequencies below 150 c.p.s., although this can be selected to have any suitable value according to the application in view.

The fuze device is mounted forwardly of the main body of the missile and the electrical means is preferably mounted forwardly of the optical system defining the single field of view. The electronic means is preferably mounted on a plurality of spaced boards carried on pillars, the boards being substantially circular and of decreasing diameter considered in the forward direction of the missile.

One embodiment of the invention will now be described by way of example, reference being made to the accompanying drawings in which:

FIGS. 1A, 1B and 1C respectively show spectral curves of the sun's radiation at sea-level, spectral emission curves from exhaust gases of a typical jet engine at low altitude and at 10 metres range, and a spectral response curve of the fuze device to be described.

Figure 2:
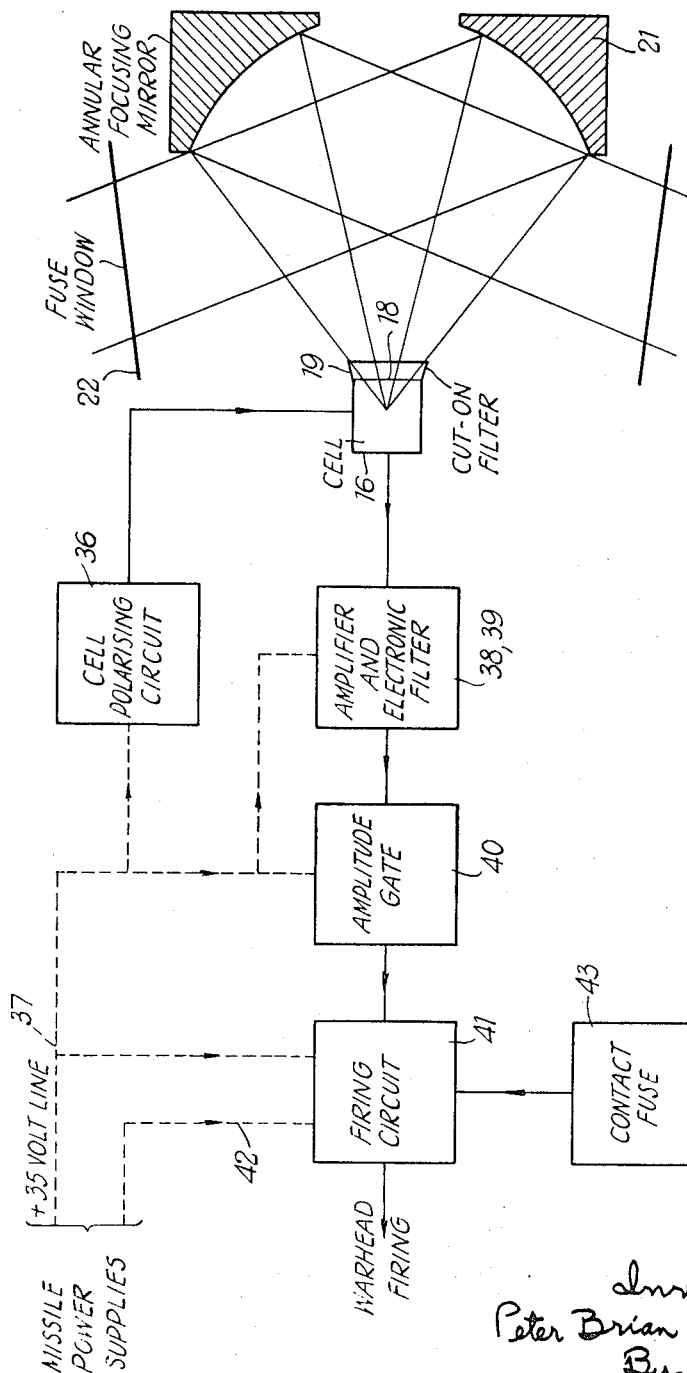
Figure 3:
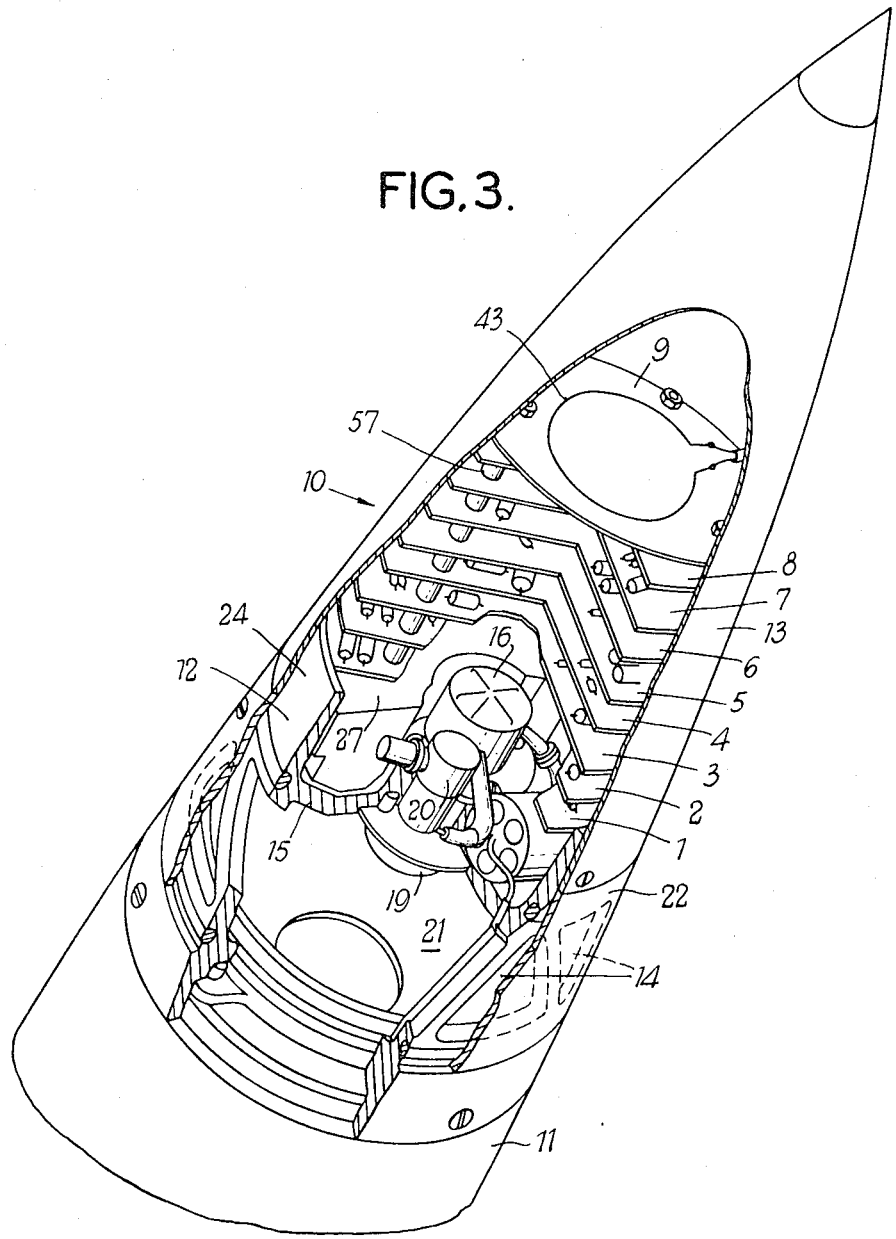
Figure 4:
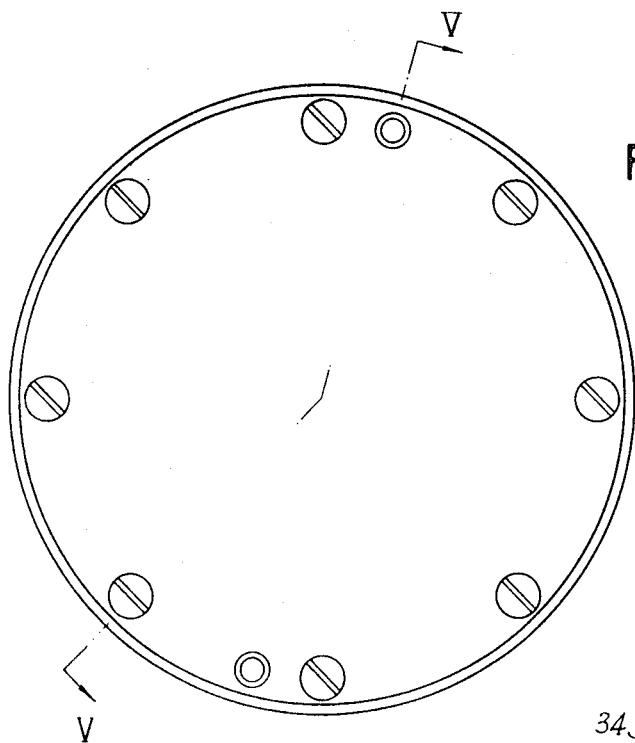
Figure 7:
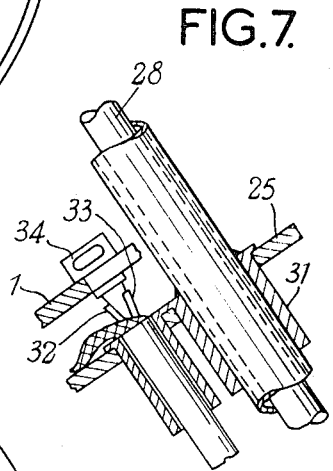
Figure 6:
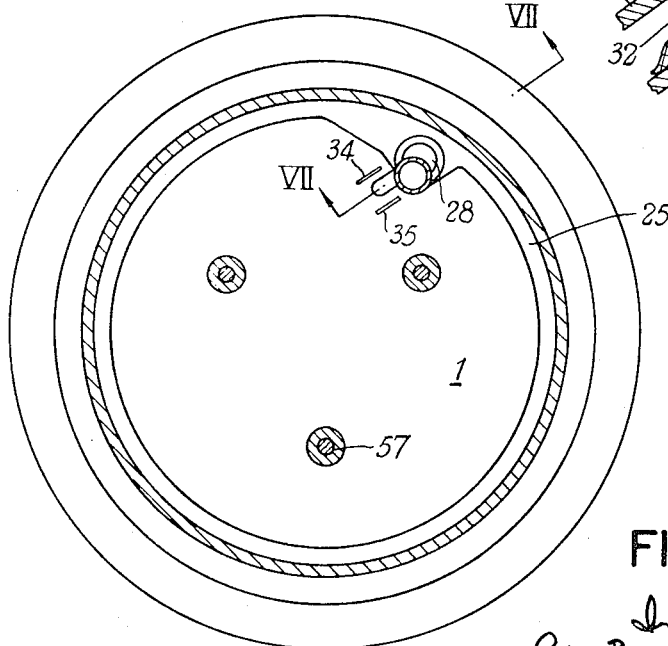
Figure 8:
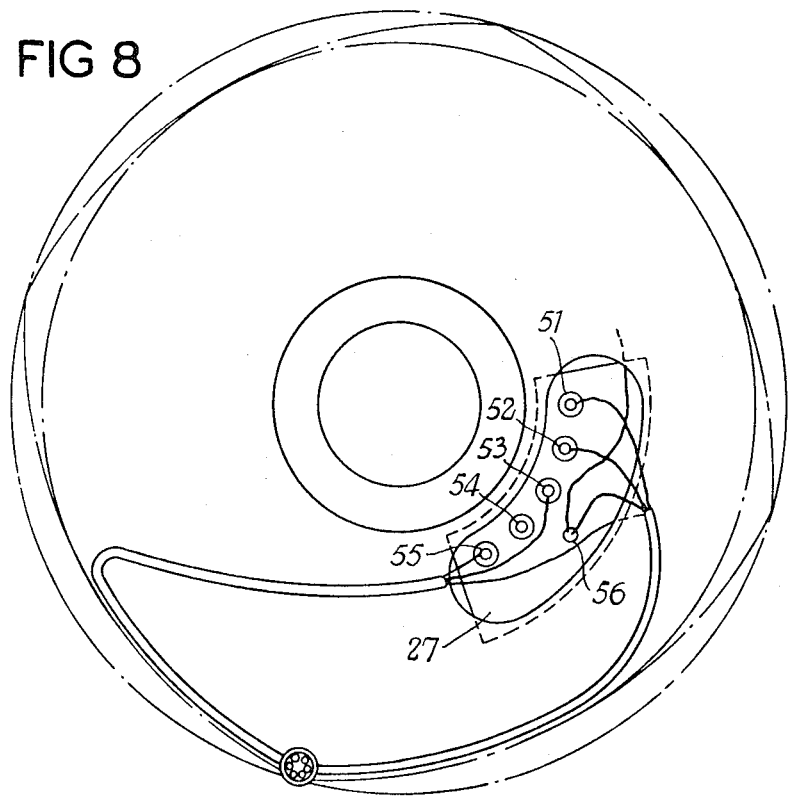
Figure 10:
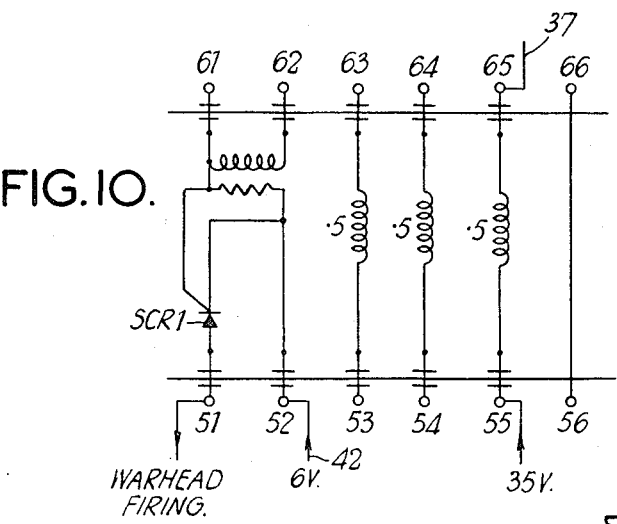
Figure 9:
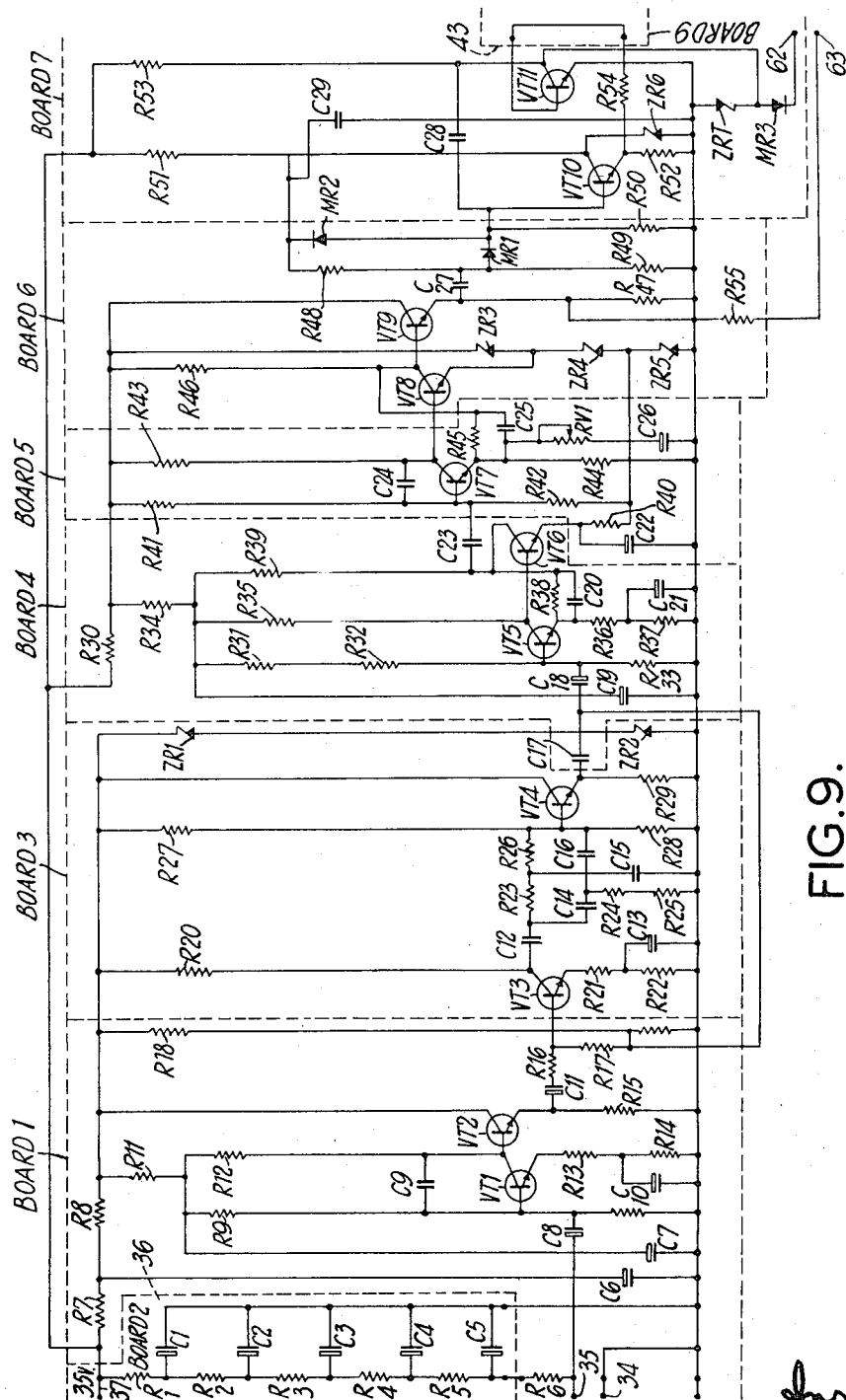

FIG. 2 is a block diagram illustrating a fuze system according to the present invention, FIG. 3 is a fragmentary perspective view of a fuze device according to the invention embodying the system of FIG. 2, FIG. 4 is an end elevational view of the fuze device of FIG. 3 on a larger scale, FIG. 5 is a fragmentary section taken on the line V—V of FIG. 4, FIG. 6 is a section taken on the line VI—VI of FIG. 5, FIG. 7 is a section taken on the line VII—VII of FIG. 6, FIG. 8 is a section taken on the line VIII—VIII of FIG. 5, FIG. 9 is a circuit diagram of the electronic means of the system shown in FIG. 2, FIG. 10 is a circuit diagram of an R.F. filter embodied in the system, and FIG. 11 is a graph illustrating the sun signal to threshold ratio plotted against missile pitch rate in °/sec. for three altitudes.

As can be seen in FIG. 1A, the spectral emission of the sun falls off at sea level at wavelengths above about 4.2 microns although there is a slight increase between about 4.4 to nearly 5 microns. This falling off is due to absorption of the sun's radiation by the earth's atmosphere. FIG. 1B shows the spectral emission from the exhaust gases of a typical jet engine at a low altitude and at about 10 metres range. It will be seen that this emission is significant between about 4.1 and 4.7 microns and it follows that a fuze device must be responsive to radiation in this range. However, in order to respond to radiation from aircraft jet pipes and piston engine exhaust stubs and also aircraft surfaces heated by kinetic energy and conduction from engines, the range of response of the fuze device should be extended to include wavelengths of between 5 to 7 microns. FIGS. 1C shows the spectral response of the fuze device to be described and it will be observed that it has a response to radiation in the range of from about 4.2 to 5.5 microns.

The fuze device of this example is indicated generally at 10 in FIG. 3 and is mounted forwardly of the main body 11 (FIG. 3) of the missile.

The fuze device comprises a light alloy base casting 12 (FIG. 5) which houses an optical assembly and a light alloy ogive-shaped spinning 13 which forms the nose cone which houses electronic means to be described. The base casting 12 is pierced intermediate its length by eight triangular apertures 14 and has a bulk head 15 forwardly of the apertures 14 which supports a photo-conductive indium antimonide cell 16 over a centrally disposed aperture 17. The aperture 17 is covered by an optical filter 18 surrounded by a rearwardly extending skirt 19. Also mounted on the bulkhead 15 in association with the cell 16 is a single shot cooling system of which part is shown at 20 and which operates to improve the sensitivity of the cell 16 by cooling it to a temperature of about −40°C. This cooling system can take any suitable form but preferably uses a refrigerant which is allowed to boil off at ambient pressure as the missile is launched, suitable means being provided to rupture a seal and allow the boiling off to commence immediately prior to launching the missile.

At the rear of the casting 12 is mounted an annular powered mirror 21 designed to provide optical gain and to focus radiation admitted through the apertures 14 on to the cell 16 through the filter 18, the skirt 19 preventing radiation impinging directly on the cell 16 from the apertures 14. The diagonal lattice-window structure is strong enough to allow the missile to be lifted by the nose and is therefore more than adequate for the aerodynamic and lateral inertia loads imposed by flight manoeuvre. The staggered window configuration provides a continuous field of view of 360° in the transverse plane of the optical system and at the same time ensures that the axial length of the aperture is constant throughout the 360° field of view. The apertures 14 are sealed by a frustoconical window 22 of calcium aluminate glass which seals the optical assembly by means of rubber 'O' rings 23 interposed between the window 22 and the casting 12. These rings 23 prevent mechanical loads other than those produced by local aerodynamic pressure being imposed on the window 22 and also overcome the effects produced by the differing thermal expansion characteristics of the window 22 and the casting 12. Any electrical wiring, which must of necessity pass across the window 22, is loomed and clipped to the underside of the diagonals defining the windows 14 so as not to give rise to obscuration problems.

In the optical system described, the filter 18 is selected so as only to pass radiation having a wavelength above about 4.2 microns and the window 22 is selected to pass only radiation having a wavelength below about 5.5 microns. The system therefore only allows the cell 16 to see radiation having a wavelength between about 4.2 microns and 5.5 microns.

The optical system is so designed that the field of view of the fuze device is slightly forward looking and is slightly diverging. Thus, in this example, in any plane containing the missile axis, the fuze has a field of view the medial line of which makes an angle of about 70° with the missile axis in the forward direction, the beam diverging so that the forward boundary of the field of view makes an angle of about 68° with the missile axis in the forward direction and the rearward boundary of the field of view makes an angle of about 72° with the missile axis in the forward direction.

The bulkhead 15 has a forwardly extending skirt 24 which is covered by a plate 25 to define a space 26 in which is disposed the cell 16, and the part 20 of the cooling system. Also within the space 26 is an R.F. filter housing 27 carried on the plate 25. Within the spinning 13 and carried on the plate 25 are nine substantially circular boards of electrically insulating material and of decreasing diameter towards the forward end of the missile. These boards are identified as boards 1 to 9 and are mounted in spaced relationship on three equiangularly disposed pillars 57 carrying electrically insulating spacing collars. Boards 1 to 7 carry the electronic means to be described, board 8 is left blank and board 9 carries a contact fuze.

In some cases, a telemetry aerial installation may be provided forwardly of the boards 1 to 9. In this case, a cable would be required to extend from the nose rearwardly of the casting 12. Such a cable is shown at 28 and it will be appreciated that the boards 1 to 9 would each have a small cut-out portion at their periphery to allow the telemetry cable 28 to pass. The cable 28 passes through a bore 29 in the rear of the casting 12 in which it is sealed by a sealing material as at 30. The cable 28 also passes through the plate 25 by way of a sleeve 31 (FIG. 7) to which the metal braiding of the cable 28 is soldered. Also passing through the plate 25 are two leads 32 and 33 which pass the output from the cell to the electronic means to be described and which are respectively connected to terminals 34 and 35 mounted on the board 1.

As can be seen in FIG. 2, the cell 16 is energised by a cell polarising circuit 36 which is supplied with a 35 volts power supply along a line indicated at 37 and is mounted on board 2. The output from the cell 16 is supplied to an amplifier 38 and electronic filter 39. The amplifier 38 is mounted on boards 1, 4, 5 and 6 and the filter mainly on board 3. The amplifier 38 and electronic filter 39 have a combined noise figure of less than 6 dB. The filter 39 has a high-pass, high-slope designed to cut-off signals having a rise-time corresponding to frequencies below about 150 c.p.s. so as to provide maximum discrimination between the signal rise rate due to the missile passing a target and that due to the sun and the missile motion. The output from the amplifier 38 and the filter 39 passes to an amplitude gate 40 which is largely mounted on board 7 but includes a diode MR1 (FIG. 9) carried on board 6. When there is an output from the gate 40 this passes to a firing circuit 41 which includes a silicon controlled rectifier SCR1 which is mounted in the R.F. filter housing 27 and which operates to switch a 6 volt supply along line 42 from the power supply (not shown) directly to a warhead igniter (not shown) which, for firing purposes, requires 4 amps. supplied into 0.5 ohms for less than a millisecond. It will be noted that this pulse of current is required to flow only once in the missile flight time, i.e. when the fuze triggers on a target at the time of nearest miss. The 35 volt power supply is only required to provide approximately 1.6 watts from 2 seconds before launch up to the time the fuze triggers.

The contact fuze carried by board 9 is a printed line 43 which is shattered on impact of the missile with a target and causes the silicon controlled rectifier SCR1 to switch and ignite the warhead.

The electronic means is shown in greater detail in FIG. 9 and the R.F. filter circuit is shown in FIG. 10. The R.F. filter circuit is provided to ensure that any extraneous radiations picked up by the external leads are filtered out to prevent faulty initiation of the fuze.

The electronic circuitry shown in FIG. 9 will now be briefly described. The 35 volt supply from the R.F. filter is fed along line 37 to the cell polarising circuit 36 which comprises a plurality of series connected resistors R1 to R6 with capacitors C1 to C5 connected in parallel. This polarising circuit 36 smooths the supply. The output from the cell 16 appears across resistor R6 and is fed to amplifying transistor VT1 followed by transistor VT2 connected as an emitter follower. A capacitor C9 connected between the collector and base electrodes of the transistor VT1 provides feedback and operates to control the frequency response of the transistor at the top end of the scale, i.e. the top cut. A capacitor C10 connected in the emitter circuit of the transistor VT1 influences the frequency response of the transistor at the lower end of the scale, i.e. the bottom cut. The output from the transistor VT2 is supplied to an amplifying transistor VT3 which is coupled to a further transistor VT4 by a filter network of the parallel T kind. This filter network is designed to provide a steep slope at the lower end of the scale i.e. at cut-on to ensure that signals having a rise-time less than about 150 c.p.s. are rejected. The output from the transistor VT4 is supplied to amplifying transistors VT5 and VT6 having a feedback connection therebetween provided by resistor R38. A capacitor C20 connected across resistor R38 influences the frequency response at the top end of the scale and a capacitor C21 in the emitter circuit of the transistor VT5 influences the frequency response at the lower end of the scale. The output from transistor VT6 is fed to further amplifying transistors VT7 and VT8 provided with a feedback resistor R45 across which is connected a capacitor C25 which influences the frequency response at the top of the scale. A capacitor C26 in the emitter circuit of transistor VT8 influences the frequency response at the lower end of the scale. A potentiometer RV1 is provided between capacitor C25 and C26 as a gain control for controlling the sensitivity of the amplifier. The output from transistor VT8 is fed to transistor VT9 which is connected as an emitter follower and which is arranged to control the triggering of a mono-stable circuit incorporating transistors VT10 and VT11. The condition of diode MR1 controls the triggering of the mono-stable circuit and a suitable bias, e.g. of 1 volt, is applied across the diode MR1 to define a threshold value which must be exceeded by the output from the transistor VT9 before the mono-stable circuit can be triggered to initiate firing of the warhead. The mono-stable circuit VT10 and VT11 is also arranged to be triggered by a break in the contact fuze 43 which is connected between the collector electrode of transistor VT10 and the base electrode of transistor VT11.

The R.F. filter circuit shown in greater detail in FIG. 10 has six terminals 51 to 56 connected externally of the electronic means described above and six terminals 61 to 66 associated with the electronic means. Terminals 66 and 56 are directly connected and represent earth. Terminal 55 is connected to the 35 volt supply line with terminal 65 connected to the supply line 37. Terminals 54 and 64 are spare. Terminal 63 is connected to the emitter electrode of transistor VT9 so that a signal representing the amplifier output is available at terminal 53. Terminal 52 is connected to the 6 volt supply and through the silicon controlled rectifier SCR1 to terminal 51 which is connected to the warhead igniter. The switching electrode of SCR1 is connected to terminal 62 which is connected to the output from the mono-stable circuit VT10 and VT11. Thus, when the output from transistor VT9 exceeds a selected threshold value, or when the contact fuze 43 is broken, the mono-stable circuit is triggered to switch the silicon controlled rectifier SCR1 to the conducting condition and apply the 6 volt supply to the warhead igniter.

It will be appreciated from the above description that the fuze device described has a single field of view of 360° about the missile axis and operates to discriminate against rediation from the sun by both optical and electronic filtering. The spectral band of the fuze is chosen to make use of the high absorption of the sun's radiation by the earth's atmosphere. Thus the filter 18 and the window 22 ensure that the cell 16 only responds to wavelengths of between about 4.2 microns and about 5.5 microns. Any radiation from the sun at low altitudes and within this wavelength band is of comparitively small amplitude. Additionally, if the sun passes through the field of view of the fuze device, the signal resulting therefrom will have a relatively slow rise-time which will correspond to frequencies below about 150 c.p.s. Due to the sharp cut-off provided by the electronic means, such signals will be rejected and cannot operate to ignite the warhead.

The response of the amplifier is chosen to make use of the difference between the sight-line spin rate when the fuze beam sweeps through the target source and the rate at which the missile can pitch in the plane containing the sun and the missile axis.

FIG. 11 shows the sun signal to threshold value plotted against pitch rate for the fuze under the following conditions:

a. the fuze is looking at the sun and the pitch plane contains the sun and missile axis,
b. the missile pitch amplitude is greater than 2° at the pitch rate stated, and
c. the sun is at its zenith for temperate climate in clear weather conditions.

Under normal conditions of operation, missile pitch rates above 125°/second are not expected to occur and, if the fuze field of view sweeps through the sun during the missile trajectory, it can be seen from FIG. 11 that the sun signal will be below the fuze threshold.

It will be understood that although, in the example described, the window 22 imposes an upper limit of 5.5 microns on the wavelength of the radiation sensed by the system, this may be extended to 6.5 microns by suitably selecting the window material. This improvement in response to radiation at these larger wavelengths provide greater capability against kinetically heated targets. In fact the radiation wavelengths to which the device responds may be controlled by suitably choosing the filter 18 and the material of the window 22. In some cases, it may be desirable to have the device respond to a relatively narrow radiation band having a mid-point of 4.4 microns where one is concerned, for example, in the detection of a jet engine exhaust.

It will be appreciated that the window 22 may be bloomed internally and externally to avoid such internal reflections as may give rise to spurious signals.

It will also be understood that the cooling achieved by the single shot cooling system is dependent upon the ambient pressure conditions existing at initiation of the boiling off of the refrigerant. Hence, a ground launch would produce a higher temperature than a launch at higher altitudes.

I claim:

1. A fuse device mounted forwardly of the main body of a missile and capable of producing a signal in proximity to a target in response to changes in infrared radiation due to the presence of a target, the device having a single field of view and including a device responsive to radiation in said field of view to produce corresponding electrical signals, optical means defining the single field of view and operable to discriminate against radiation outside a selected range of wavelengths, and electronic means mounted forwardly of the optical system on a plurality of spaced boards carried on pillars, the boards being substantially circular and of decreasing diameter considered in the forward direction of the missile, the electronic means being supplied with said electrical signals and having a frequency band-pass selected to reject signals having a frequency below a selected value corresponding to a selected minimum rise time of the signals.

2. A fuze device according to claim 1 including a contact fuze carried on one of said boards and operable on impact to generate a warhead igniting signal.

* * * * *